(12) United States Patent
Tsunehara et al.

(10) Patent No.: US 7,969,347 B2
(45) Date of Patent: Jun. 28, 2011

(54) METHOD FOR MEASURING DISTANCE AND POSITION USING SPREAD SPECTRUM SIGNAL, AND AN EQUIPMENT USING THE METHOD

(75) Inventors: Katsuhiko Tsunehara, Kokubunji (JP); Nobukazu Doi, Hachioji (JP); Mikio Kuwahara, Kokubunji (JP); Tomoaki Ishifuji, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/651,780

(22) Filed: Jan. 4, 2010

(65) Prior Publication Data
US 2010/0103047 A1    Apr. 29, 2010

Related U.S. Application Data

(63) Continuation of application No. 11/976,979, filed on Oct. 30, 2007, now Pat. No. 7,663,532, which is a continuation of application No. 11/059,407, filed on Feb. 17, 2005, now Pat. No. 7,609,197, which is a continuation of application No. 10/680,089, filed on Oct. 8, 2003, now Pat. No. 6,900,753, which is a continuation of application No. 10/166,090, filed on Jun. 11, 2002, now Pat. No. 6,657,579, which is a continuation of application No. 09/640,018, filed on Aug. 17, 2000, now Pat. No. 6,459,402.

(30) Foreign Application Priority Data

Jun. 27, 2000    (JP) .................................. 2000-197863

(51) Int. Cl.
*G01S 13/08*    (2006.01)
*G01S 13/00*    (2006.01)

(52) U.S. Cl. .............. 342/47; 342/42; 342/46; 342/118; 342/145; 342/146; 342/175; 342/195; 342/450; 342/451; 375/130; 375/140; 375/147

(58) Field of Classification Search .............. 342/42–59, 342/118, 125–127, 145–147, 175, 195–197, 342/450–465; 375/130–153; 455/456.1–456.6, 455/457, 403, 422.1
See application file for complete search history.

(56) References Cited

U.S. PATENT DOCUMENTS 3,302,199 A    1/1967    Kelly et al.
(Continued)

FOREIGN PATENT DOCUMENTS

EP    470272    2/1992
(Continued)

OTHER PUBLICATIONS

"Navigation Systems—Level 3" on the Internet at www.allstar.fiu.edu no author listed, copyrighted 1995.

*Primary Examiner* — Bernarr E Gregory
(74) *Attorney, Agent, or Firm* — Mattingly & Malur, PC

(57) ABSTRACT

By using the delay profile created by delay profile creating section 102 and the first threshold value 330 received from the first threshold value calculation 105, the first threshold value timing detection section 103 selects only the earliest receive timing exceeding the first threshold value, from all the timing that the correlation value in the delay profile becomes a maximum. By using the receive timing and the second threshold value 331 received from the second threshold value calculation section 107, reference timing calculation section 106 selects the reference timing required for calculating the receive timing for the incoming wave of the minimum propagation delay time. The timing delayed by previously set timing behind said reference timing is sent from receive timing calculation section 108 as the receive timing 113 of the incoming wave of the minimum propagation delay time.

8 Claims, 7 Drawing Sheets

U.S. PATENT DOCUMENTS

| | | |
|---|---|---|
| 3,321,757 A | 5/1967 | Crow et al. |
| 4,665,404 A | 5/1987 | Christy et al. |
| 5,583,517 A | 12/1996 | Yokev et al. |
| 5,592,180 A | 1/1997 | Yokev et al. |
| 5,596,330 A | 1/1997 | Yokev et al. |
| 5,629,710 A | 5/1997 | Sawada |
| 5,692,008 A | 11/1997 | Van Nee |
| 5,883,598 A | 3/1999 | Parl et al. |
| 5,945,948 A | 8/1999 | Buford et al. |
| 5,945,949 A | 8/1999 | Yun |
| 5,949,816 A * | 9/1999 | Okamoto .................. 375/150 |
| 5,952,969 A | 9/1999 | Hagerman et al. |
| 5,999,131 A | 12/1999 | Sullivan |
| 6,006,096 A | 12/1999 | Trompower |
| 6,011,974 A | 1/2000 | Cedervall et al. |
| 6,021,330 A | 2/2000 | Vannucci |
| 6,031,490 A | 2/2000 | Forssen et al. |
| 6,034,635 A | 3/2000 | Gilhousen |
| 6,047,017 A | 4/2000 | Cahn et al. |
| 6,108,553 A | 8/2000 | Silventoinen et al. |
| 6,108,555 A | 8/2000 | Maloney et al. |
| 6,167,276 A | 12/2000 | Pite |
| 6,226,317 B1 | 5/2001 | Bruckert et al. |
| 6,243,588 B1 | 6/2001 | Koorapaty et al. |
| 6,249,253 B1 * | 6/2001 | Nielsen et al. .................. 342/463 |
| 6,259,404 B1 | 7/2001 | Parl et al. |
| 6,304,218 B1 | 10/2001 | Sugiura et al. |
| 6,353,412 B1 | 3/2002 | Soliman |
| 6,459,402 B1 | 10/2002 | Tsunehara et al. |
| 6,603,800 B1 | 8/2003 | Mesecher |
| 6,657,579 B2 | 12/2003 | Tsunehara et al. |
| 6,694,142 B1 | 2/2004 | Kuwahara et al. |

FOREIGN PATENT DOCUMENTS

| | | |
|---|---|---|
| EP | 0913702 | 5/1999 |
| JP | 05-264729 | 10/1993 |
| JP | 7-181242 | 7/1995 |
| JP | 07-181242 | 7/1995 |
| JP | 11-251960 | 9/1999 |
| JP | 11-308658 | 11/1999 |
| JP | 11-326484 | 11/1999 |
| JP | 2000-050343 | 2/2000 |
| JP | 2000-075012 | 3/2000 |
| JP | 2000-151558 | 5/2000 |

* cited by examiner

METHOD FOR MEASURING DISTANCE AND POSITION USING SPREAD SPECTRUM SIGNAL, AND AN EQUIPMENT USING THE METHOD

CROSS REFERENCES

This is a continuation application of U.S. Ser. No. 11/976,979, filed Oct. 30, 2007 (now U.S. Pat. No. 7,663,532), which is a continuation application of U.S. Ser. No. 11/059,407, filed Feb. 17, 2005 (now U.S. Pat. No. 7,609,197), which is a continuation application of U.S. Ser. No. 10/680,089, filed Oct. 8, 2003 (now U.S. Pat. No. 6,900,753), which is a continuation application of U.S. Ser. No. 10/166,090, filed Jun. 11, 2002 (now U.S. Pat. No. 6,657,5791, which is a continuation application of U.S. Ser. No. 09/640,018, filed Aug. 17, 2000 (now U.S. Pat. No. 6,459,402). The entire disclosures of all of the above-identified applications are hereby incorporated by reference.

BACKGROUND OF THE INVENTION

The present invention relates to terminal equipment for measuring its own position, particularly to equipment for measuring distances and positions using the radio waves emitted from, base stations fixed on the ground, including CDMA base stations.

The principles of distance measurement using a spread spectrum signal are described using FIG. 9. The station for transmitting the spread spectrum signal transmits this signal in send timing 400. The aforementioned receiving station receives the spread spectrum signal and obtains receive timing 401. Differential time 402 between receive timing 401 and send timing 400 is detected as the propagation time of the spread spectrum signal. The distance between the transmitting station and the receiving station can be calculated by multiplying differential time 402 by the velocity of light. Because of the principles described above, distance measurement using a spread spectrum signal requires the measurement of receive timing 401 at the receiving station.

Next, the principles of position measurement using a spread spectrum signal are described. The distances to individual transmitting stations are measured by the receiving station, subject to the principles described above. The use of the thus-obtained distances between the receiving station and each base station and of the positions of the base stations enables the position of the receiving station to be detected by solving the equation where the position thereof is taken as an unknown quantity. Details of one such detection method are disclosed in, for example, Japanese Laid-Open Patent Publication No. Hei 7-181242 (1995).

To use spread spectrum signals for conducting distance or position measurements in this way, it is necessary to measure the receive timing of the aforementioned spread spectrum signal at the terminal equipment. In Japanese Laid-Open Patent Publication No. Hei 7-181242 (1995), the following method for measuring such receive timing is disclosed: the correlation values between the received signal and the predetermined code series for creating spread spectrum signals (hereinafter, collectively called the PN code) are calculated for each receiving event, and a profile is created that shows the values corresponding to the correlation values in each receiving event (hereinafter, this profile is called the delay profile); wherein an epitomized diagram of the delay profile is shown as 1 in FIG. 10, and the timing where the correlation value becomes a maximum in the delay profile is searched for and the corresponding timing is detected as the timing in which the spread spectrum signal is received. In the example of FIG. 10, "$t_{prev}$" is the receive timing.

SUMMARY OF THE INVENTION

During distance measurement and position measurement, it is important to measure the receive timing of the signal wave that has first arrived at the terminal equipment, namely, the incoming wave of the minimum propagation delay time. Consider the case that as shown in FIG. 11, a plurality of spread spectrum signals from a single spread spectrum signal transmitting station are passed along different propagation routes and received at terminal equipment as incoming waves 1 and 2 different in both propagation delay time and signal intensity. In this case, the delay profile received takes the shape of delay profile 12, a combination of delay profiles 10 and 11 corresponding to incoming waves 1 and 2, respectively. In this case, only receive timing 22 of incoming wave 2 can be detected with the prior art. In the example of FIG. 11, since incoming wave 1 has the minimum propagation delay time and is received in timing 21, receive timing for the incoming wave of the minimum propagation delay time cannot be measured using the prior art. As a result, receive timing measurement errors occur and this makes accurate distance or position measurement impossible.

For these reasons, the use of the present invention enables the distance between a signal transmitting station and a signal receiving station to be measured by creating a delay profile from the signal wave received from the signal transmitting station, then taking the startup timing of the delay profile as reference timing, and detecting the timing delayed by a predetermined value behind the reference timing.

To measure position, it is necessary to calculate the foregoing reference timing for at least three signal transmitting stations, then calculate the differences in send timing between the corresponding signal transmitting stations, and detect the position of the signal receiving station from the respective relative time differences.

DETAILED DESCRIPTION OF THE INVENTION

Figure 2:
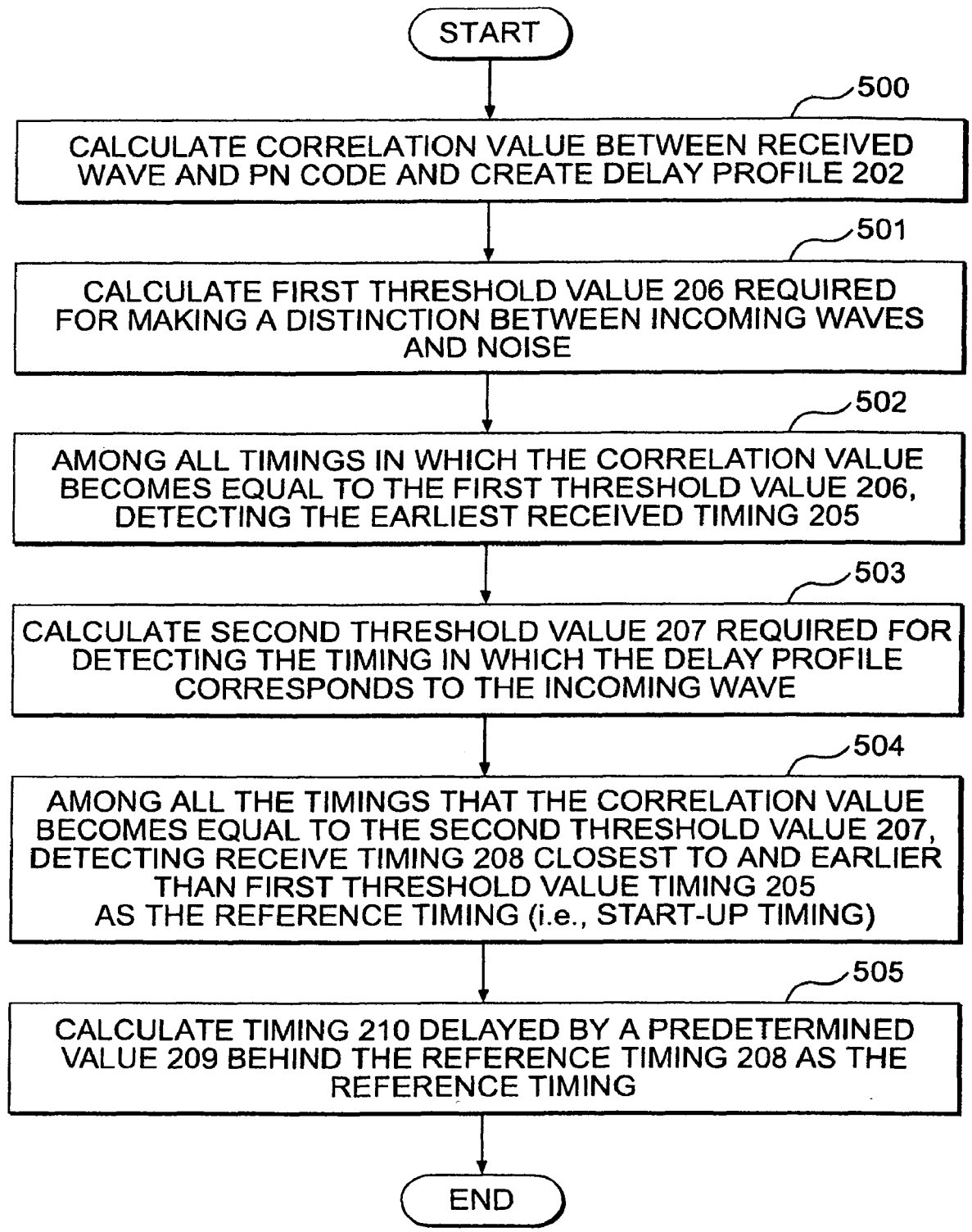
FIG. 2 is a flowchart of the receive timing measurement algorithm used in the present invention.
Figure 4:
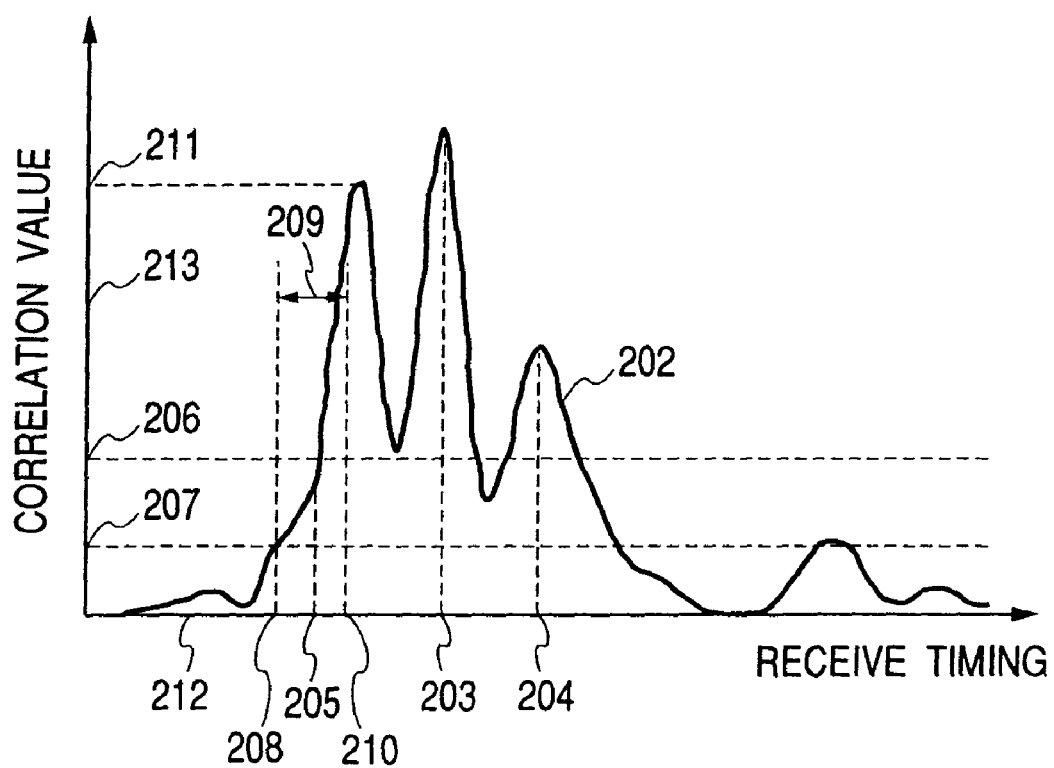
FIG. 4 shows an example of a delay profile.

The receive timing measurement algorithm used in the present invention is described using the flowchart shown in FIG. 2, and an example of the delay profile shown in FIG. 4.

In first step 500, the correlation value between the received wave and the PN code is calculated and delay profile 202 is created.

In step 501, threshold value 206 required for making a distinction between incoming waves and noise (hereinafter, this threshold value is called the first threshold value) is calculated in delay profile 202. At this time, if in delay profile 202, the correlation value exceeds the first threshold value 206, this threshold value is used to judge that an incoming wave is present in the particular timing, and this threshold value is sufficiently greater than the noise level.

In step 502, among all the timing that the correlation value becomes equal to the foregoing first threshold value 206, only the earliest receive timing 205 is detected (hereinafter, the earliest receive timing is called the first threshold value timing).

In step 503, threshold value 207 required for detecting the timing in which the delay profile corresponding to the incoming wave is calculated (hereinafter, this threshold value is called the second threshold value). At this time, the second threshold value 207 is used to detect the timing in which the delay profile is started up from the noise level, and this threshold value is practically equal to the noise level.

In step 504, among all the timing that the correlation value becomes equal to the foregoing second threshold value 207, only the receive timing 208 closest to and earlier than the first threshold value timing 205 is detected as reference timing. Reference timing 208, therefore, denotes the timing in which the delay profile corresponding to the incoming wave is started up from the noise level.

In step 505, the timing 210 delayed by predetermined value 209 behind the aforementioned reference timing 208 is calculated as reference timing. This means that the incoming wave has arrived at the receiving station in receive timing 210. Theoretically, predetermined value 209, under its noiseless state, has a tip value of 1.0. In actuality, however, since noise exists, an edge subsequent to the true leading edge is detected as rise timing. This timing difference should therefore be subtracted to obtain a value from about 0.7 to 1.0.

During position measurement that uses spread spectrum signals, when this measuring method, as with one shown in Japanese Laid-Open Patent Publication No. Hei 7-181242 (1995), is to be used to conduct measurements using the relative distance differences between each transmitting station and the receiving station, step 505 can be omitted and, instead, the reference timing 208 obtained in step 504 can be taken as receive timing 210.

Figure 1:
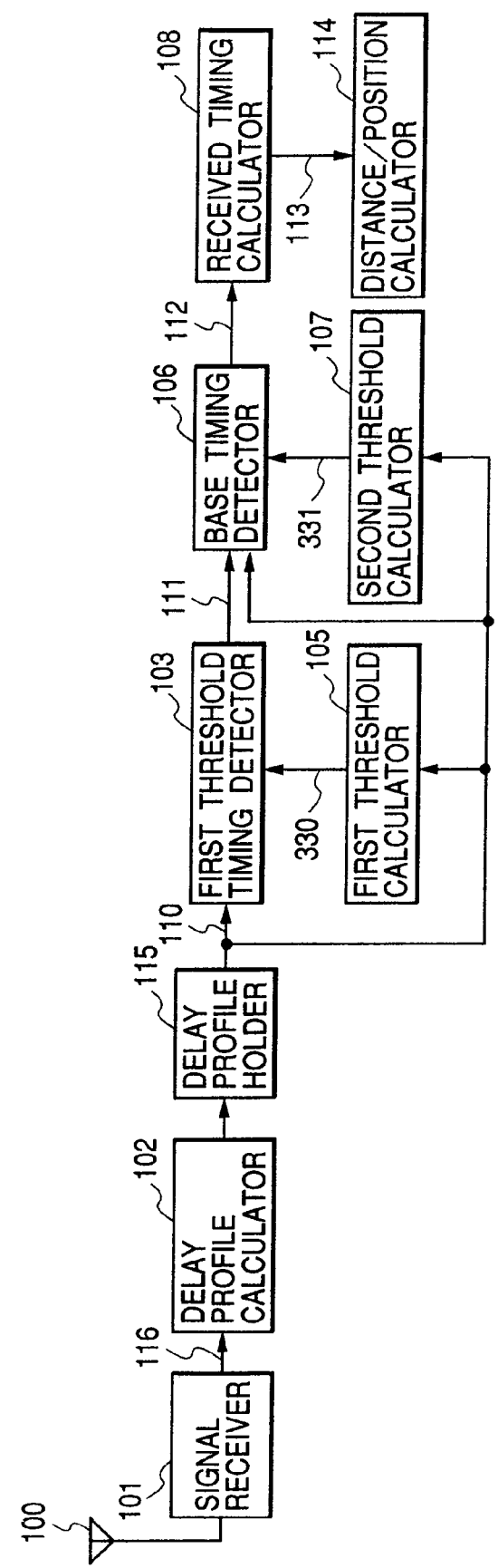
FIG. 1 is a structural diagram of terminal equipment, the first embodiment of the present invention.

The construction of the terminal equipment, one embodiment of the present invention, is shown in FIG. 1. The spread spectrum signal that has been received by antenna 100 is sent to signal receiving section 101, where the signal then undergoes high/medium-frequency receiving and baseband signal demodulation. The spread spectrum signal, after undergoing processing in signal receiving section 101, is further sent to delay profile creating section 102. The correlation value between the received spread spectrum signal and the PN code is calculated for each receiving event by delay profile creating section 102, which then creates a delay profile that shows the values corresponding to the correlation values in each receiving event.

Figure 3:
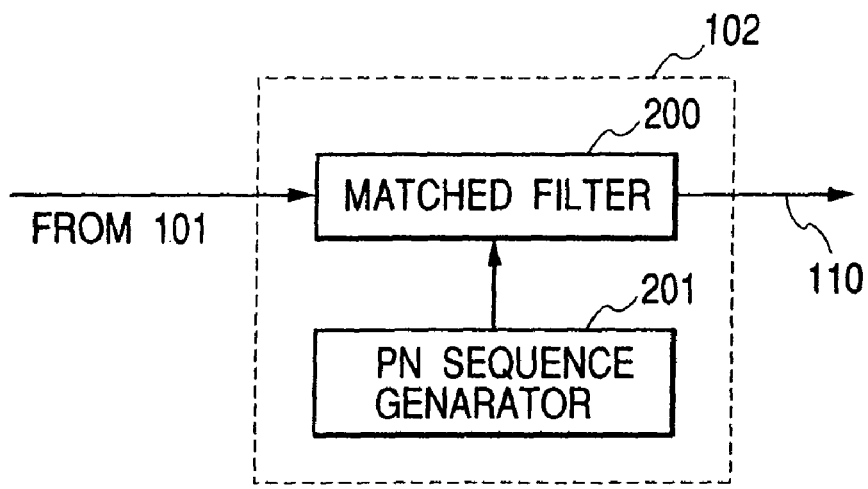
FIG. 3 is a structural diagram of the delay profile creating section.

A structural example of delay profile creating section 102 using a matched filter is shown in FIG. 3. In FIG. 3, matched filter 200 calculates the correlation value between the received spread spectrum signal and the PN code created by PN code generator 201, and sends to signal line 110 the value corresponding to the correlation value. An example of a delay profile created by delay profile creating section 102 is shown as solid line 202 in FIG. 4. In FIG. 4, horizontal axis 212 denotes receive timing and as the delay profile bring closer to the left of the horizontal axis, the receive timing becomes earlier, that is, the propagation delay time decreases. Vertical axis 213 in FIG. 4 denotes correlation values.

The delay profile that has been created by delay profile creating section 102 is then held in delay profile holding section 115. Delay profile holding section 115 can be, for example, a memory. The delay profile, after being held in delay profile holding section 115, is sent to the first threshold value timing detection section 103, the first threshold value calculation section 105, reference timing calculation section 106, and the second threshold value calculation section 107.

Figure 5:
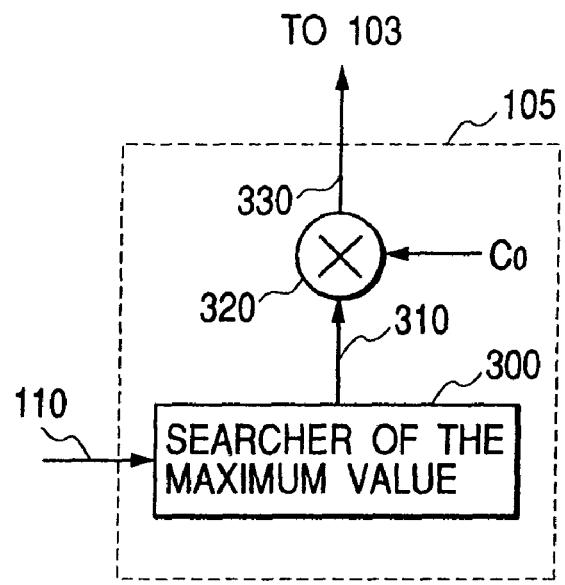
FIG. 5 shows the first structural example of the first threshold value calculation section.

The first threshold value calculation section 105 calculates the threshold value to be used for the first threshold value timing detection section 103. A structural example of the first threshold value calculation section 105 is shown in FIG. 5. In this figure, the maximum value searching section 300 sends the maximum correlation value (existing in receive timing 203) of the delay profile received via signal line 110. Multiplier 320 multiplies the maximum correlation value 310 and coefficient $C_0$ and sends the results to the first threshold value timing detection section 103 as the first threshold value 330. Coefficient $C_0$ is set to about 0.1. This avoids the likely misrecognition of a side lobe caused by the characteristics of the band limiting filter within signal receiving section 101 during the creation of a delay profile; the side lobe being equivalent to a maximum correlation value 310 of about 0.1 in terms of magnitude.

Figure 6:
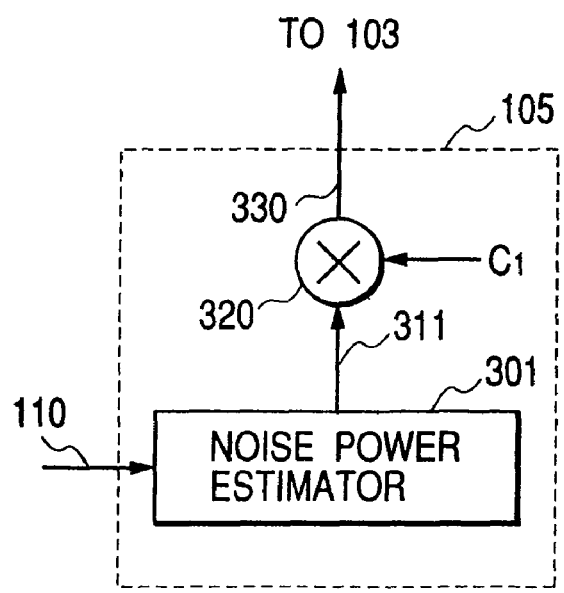
FIG. 6 shows the second structural example of the first threshold value calculation section.

Another structural example of the first threshold value calculation section 105 is shown in FIG. 6. In this figure, noise power estimating section 301 estimates noise power using the delay profile received via signal line 110, and generates an output of noise power 311. The following two methods are available to measure noise power:

(1) Approximating all received signal power to noise power (2) Creating a profile repeatedly and calculating the dispersion in the peak correlation values of the profiles Method (2) above, although higher than method (2) in accuracy, requires a long measuring time. Method (1) above, therefore, is used in FIG. 6.

Multiplier 320 multiplies the abovementioned noise power 311 and coefficient $C_1$ and sends the results to the first threshold value timing detection section 103 as the first threshold value 330. Coefficient $C_1$ is set to a value from about 10 to 100 for this reason: when the noise is considered to be white noise, momentary amplitude changes in accordance with the required distribution, and in this case, if the noise power is taken as the square of σ, the probability where the momentary amplitude exceeds 3σ is about 3/1000, which is sufficiently slow as the probability of an measuring error occurring, and thus since an amplitude of 3σ is nine times the square of σ in terms of power, $C_1$ needs only to be more than nine.

In FIG. 6, output 116 of signal receiving section 101 can likewise be used as the input of noise power estimating section 301. Also, the first threshold value calculation section 105 can have the structural components shown in both FIGS. 5 and 6, and send the greatest of the threshold values calculated thereby, to the first threshold value timing detection section 103 as the first threshold value 330. Or the first threshold value calculation section 105 can have the structural components shown in both FIGS. 5 and 6, and send the smallest of the threshold values calculated thereby, to the first threshold value timing detection section 103 as the first threshold value 330.

The first threshold value 330 received from the first threshold value calculation section 105 is used for the first threshold value timing detection section 103 to generate the earliest receive timing in which the correlation value becomes equal to the first threshold value 330. The operation of the first threshold value timing detection section 102 is described using FIG. 4. In FIG. 4, discontinuous line 206 represents the first threshold value 330 received from the first threshold value calculation section 105. The earliest receive timing 205 that, in delay profile 202, the correlation value becomes equal to threshold value 206 is sent from the first threshold value timing detection section 103 to signal line 111.

Figure 7:
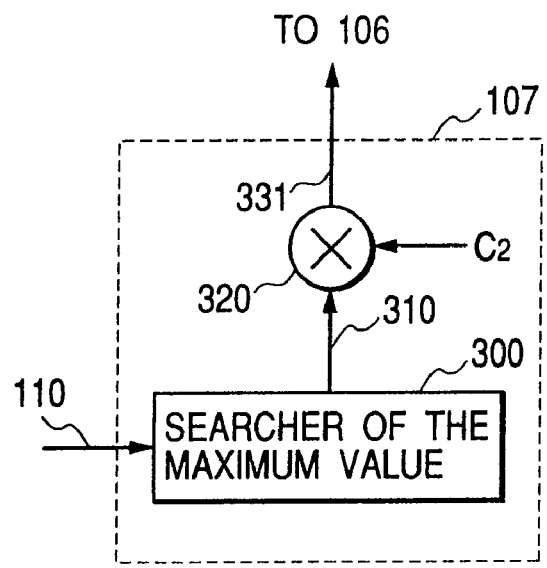
FIG. 7 shows the first structural example of the second threshold value calculation section.

The second threshold value calculation section 107 calculates the threshold value to be used for reference timing calculation section 106. A structural example of the second threshold value calculation section 107 is shown in FIG. 7. In this figure, the same components as those shown in FIG. 5 as the first structural example of the first threshold value calculation section 105, are each assigned the same number as that of each shown in FIG. 5. Multiplier 320 multiplies the maximum correlation value 310 sent from the maximum value searching section 300, and coefficient $C_2$, and sends the results to reference timing calculation section 106 as the second threshold value 331. Coefficient $C_2$ is set to about 0.1, which is based on data that was measured using an experimental machine.

Figure 8:
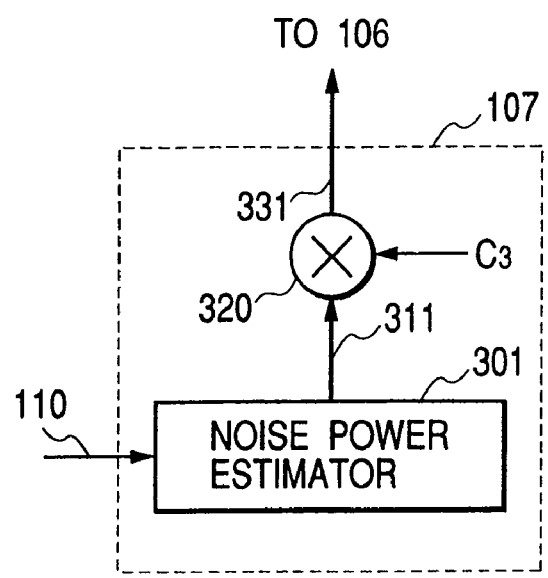
FIG. 8 shows the second structural example of the second threshold value calculation section.
Figure 9:
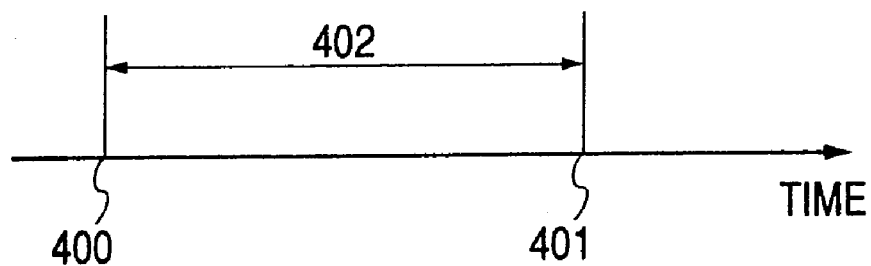
FIG. 9 is a diagram explaining the principles of distance measurement.
Figure 10:
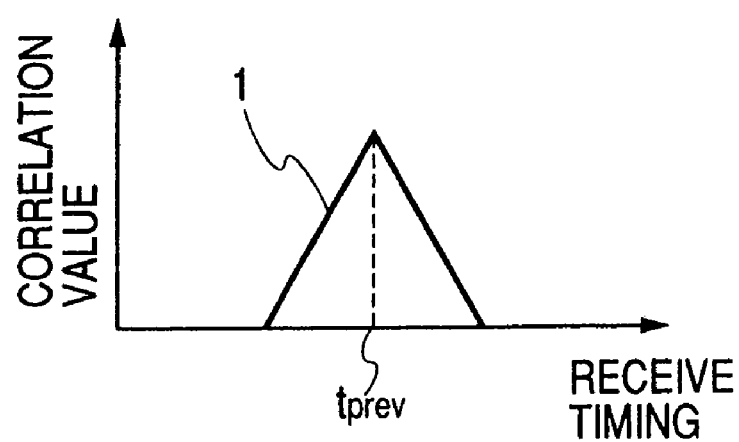
FIG. 10 is an epitomized diagram of a delay profile.

Another structural example of the second threshold value calculation section 107 is shown in FIG. 8. In this figure, the same components as those shown in FIG. 6 as the second structural example of the first threshold value calculation section 105, are each assigned the same number as that of each shown in FIG. 6. Multiplier 320 multiplies the noise power 311 sent from noise power estimating section 301, and coefficient $C_3$, and sends the results to reference timing calculation section 106 as the second threshold value 331. Coefficient $C_3$ is set to about 7, which is based on data that was measured using an experimental machine.

In FIG. 8, output 116 of signal receiving section 101 can likewise be used as the input of noise power estimating section 301. Also, the second threshold value calculation section 107 can have the structural components shown in both FIGS. 7 and 8, and send the greatest of the threshold values calculated thereby, to reference timing calculation section 106 as the second threshold value 331. Or the second threshold value calculation section 107 can have the structural components shown in both FIGS. 7 and 8, and send the smallest of the threshold values calculated thereby, to reference timing calculation section 106 as the second threshold value 331.

The second threshold value 331 received from the second threshold value calculation section 107, the receive timing detection results received from the first threshold value timing detection section 103, and the delay profile received from delay profile holding section 115 are used for reference timing calculation section 106 to calculate the reference timing for obtaining the receive timing of the incoming wave of the minimum propagation delay time. The operation of reference timing calculation section 106 is described using FIG. 4. In FIG. 4, single-dot dashed line 207 represents the second threshold value 331 received from the second threshold value calculation section 107. Reference timing calculation section 106 compares the correlation value and threshold value 207 in the receive timing 205 that has been received from the first threshold value timing detection section 103. If both values mismatch, the receive timing is advanced and the correlation value and threshold value 207 in said receive timing are compared. This sequence is repeated until the correlation value and threshold value 207 have matched, and the corresponding receive timing is sent as an output. In the example of FIG. 4, receive timing 208 in which the correlation value and threshold value 207 match is sent as reference timing to signal line 112.

The reference timing received from reference timing calculation section 106 via signal line 112 is used for receive timing calculation section 108 to calculate the receive timing for the signal wave that has first arrived at the terminal equipment, namely, the incoming wave of the minimum propagation delay time. The operation of receive timing calculation section 108 is described using FIG. 4. Timing 210 delayed by previously set timing 209 behind the reference timing 208 that has been sent from reference timing calculation section 106 is detected as the receive timing for the wave of the minimum propagation delay time, and the detected receive timing is then sent to signal line 113.

Figure 11:
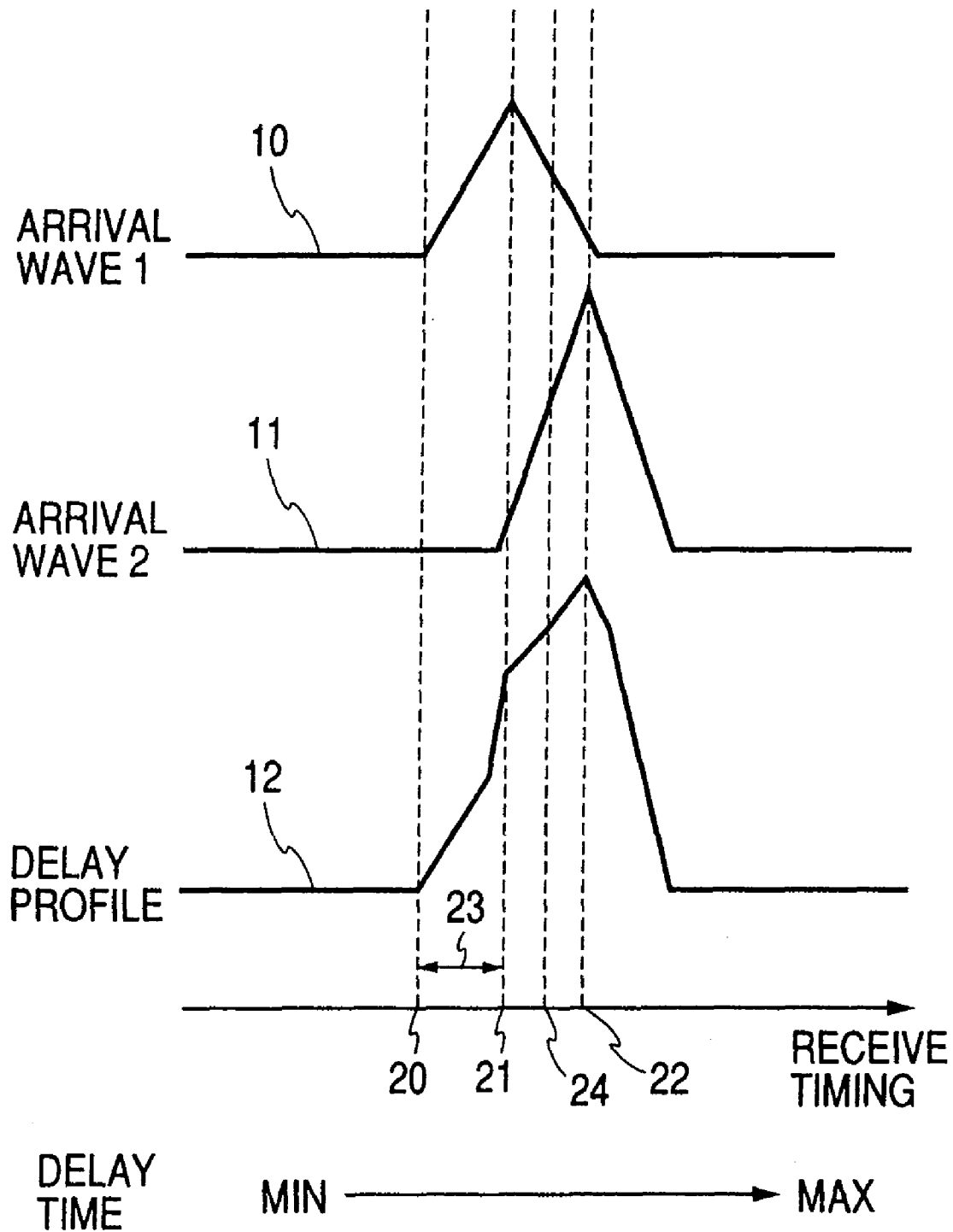
FIG. 11 is an epitomized diagram of the delay profiles created when two incoming waves are present.

The above method when applied to delay profile 12 shown in FIG. 11 is described. The first threshold value timing detection section can send receive timing 24 by using the appropriate first threshold value 330. Next, the reference timing calculation section can send receive timing 20 by using the appropriate second threshold value 331. Furthermore, receive timing calculation section 108 can detect receive timing 21 by first measuring beforehand, under an environment having only one incoming wave, timing difference 23 between all values from the startup timing of the delay profile to the maximum value thereof, and then using said timing difference 23 in receive timing calculation section 108. Receive timing 21 is the receive timing for incoming wave 1, the signal wave that has first arrived. In other words, even if two incoming waves are received in overlapping form, it is possible to detect the receive timing for the signal wave that has first arrived.

Based on the receive timing 113 sent from receive timing calculation section 108, calculations for distance measurement or position measurement are performed by distance/position measuring section 114. Distance/position measuring section 114 can use, for example, the method disclosed in Japanese Laid-Open Patent Publication No. Hei 7-181242 (1995).

During position measurement that uses spread spectrum signals, when this measuring method, as with one shown in Japanese Laid-Open Patent Publication No. Hei 7-181242 (1995), is to be used to conduct measurements using the relative distance differences between each transmitting station and the receiving station, processing by receive timing calculation section 108 can be omitted and, instead, output 112 of reference timing calculation section 106 can be connected to signal line 113 and the corresponding output value can be sent to distance/position measuring section 114. In this case, delay profiles are created using the signal waves received from at least three signal transmitting stations, and then the first and second threshold values are created for each such delay profile. Subsequently, the startup timing of each delay profile is detected and the differences in send timing between the corresponding signal transmitting stations are used for the receiving station to measure its position from the relative time differences between the signal transmitting stations.

The present invention enables accurate detection of the receive timing for the first incoming wave arriving under the multi-path environment that a plurality of incoming waves are received in overlapping form. Thus, it is possible to minimize measurement errors at the terminal equipment that uses spread spectrum signals to conduct distance and position measurements.

What is claimed is:

1. A position measuring device which measures a position of a signal transmitting device, comprising:
- a delay profile calculating unit which creates a delay profile representing a correlation between a predetermined code and a signal which is received by a signal receiving device;
- a received timing calculating unit which determines an incoming wave determination timing which is used to determine a reception of a particular incoming wave transmitted by said signal transmitting device in said signal receiving device and that is a point in time when a value of said delay profile becomes equal to a first threshold, determines a rising timing when said delay profile rises from a noise level and that is a point in time when each value of said delay profile becomes equal to a second threshold which is lower than said first threshold before said incoming wave determination timing, and determines each received timing when said signal receiving device receives said signal as to said incoming wave with reference to said rising timing; and
- a position calculating unit which calculates each distance between a plurality of said signal receiving devices and said signal transmitting device on the basis of said received timing and measures said position of signal transmitting device from said distances.

2. The position measuring device according to claim 1, wherein said first threshold value and said second threshold value are set on the basis of a maximum correlation value in said delay profile.

3. The position measuring device according to claim 2, wherein said first threshold value is obtained by multiplying said maximum correlation value by a first predetermined coefficient, and
wherein said second threshold value is obtained by multiplying said maximum correlation value by a second predetermined coefficient.

4. The position measuring device according to claim 1, wherein said first threshold value and said second threshold value are set on the basis of a noise value in said delay profile.

5. The position measuring device according to claim 4, wherein said first threshold value is obtained by multiplying said noise value by a first predetermined coefficient, and
wherein said second threshold value is obtained by multiplying said noise value by a second predetermined coefficient.

6. The position measuring device according to claim 1, wherein said received timing is delayed by a predetermined time behind said rising timing.

7. The position measuring device according to claim 1, wherein said position calculating unit calculates said distance on the basis of time difference between said received timing and a point of time when said signal transmitting device transmits said signal.

8. A position measuring method comprising the steps of:
- creating delay profiles each representing a correlation between a predetermined code and each of signals which a plurality of signal receiving devices receive by calculating a correlation value between said predetermined code and each of said signals;
- determining each incoming wave determination timing which is used to determine a reception, in each of said signal receiving devices, of a particular incoming wave transmitted by said signal transmitting device and that is a point in time when each value of said delay profiles becomes equal to a first threshold;
- determining each rising timing when each of said delay profiles rises from a noise level and that is a point in time when each value of said delay profiles becomes equal to a second threshold which is lower than said first threshold before said incoming wave determination timing;
- determining each received timing when each of said signal receiving devices receives said signal as to said incoming wave with reference to said rising timing;
- calculating distances between each of said signal receiving devices and said signal transmitting device on the basis of said received timing; and
- measuring said position of signal transmitting device from said distances.

* * * * *